Figure 1:
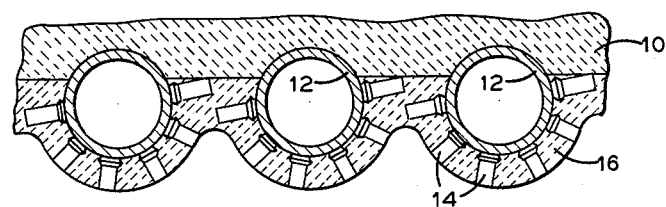

July 7, 1964  G. LUMM ETAL  3,139,866

STUDDED TUBE CONSTRUCTION WITH STUDS OF AlCr

Filed May 4, 1959

INVENTORS
Gunther Lumm
Eduard Jahn
BY
ATTORNEY 3,139,866
STUDDED TUBE CONSTRUCTION WITH
STUDS OF AlCr
Gunther Lumm and Eduard Jahn, Oberhausen, Germany, assignors to Babcock & Wilcox, Limited, London, England, a company of Great Britain
Filed May 4, 1959, Ser. No. 810,958
Claims priority, application Germany May 3, 1958
6 Claims. (Cl. 122—6)

This invention relates to refractory lined studded-tube walls for slag-tap furnaces for steam generators and the like.

The studded tubes for such walls are formed by welding studs to the tubes, either by automatic welding apparatus or by hand guns, using electric resistance welding in the usual case, although other types of welding are sometimes used. The wall thickness of the tube must be sufficient to prevent burning through during welding and, for this reason, is frequently in excess of the thickness required to withstand the stresses due to the design operating temperatures and pressures for the tube. The minimum wall thickness required to prevent burning through during welding of the studs to the tube is of the order of 5 mm.

When the refractory lining is applied to such studded tube walls, the ends of the studs are exposed as the depth of the refractory must be no greater than an amount of the order of the stud length in order to provide adequate support for the refractory lining. If the lining depth exceeds the stub length so that the lining projects beyond and covers the stud ends, such unsupported layer of the lining disintegrates or crumbles away relatively rapidly.

Consequently, the free ends of the studs are exposed to the hot gases. In the case of slag tap or wet bottom furnaces, a reducing atmosphere prevails at various points, resulting in the production of $H_2S$ in the combustion gases, and thus the stub ends are subjected to the corrosive effect of this $H_2S$. As the refractory lining gradually crumbles or melts away, more portions of the studs are exposed to erosion by mechanical and chemical action and, when such deterioration of the studs progresses further, the studs fail to provide sufficient anchorage for the refractory lining. The refractory lining thus gradually disappears, exposing the bare tube walls to the action of the hot gases, and the metal of the tube walls deteriorates rapidly due to mechanical and chemical erosion.

A natural solution to this problem would be to fabricate the tubes and studs from the type of scaling-resistant high alloy steels that are employed in the construction of steam generators, particularly those portions thereof subjected to very high temperatures. However, this would not only substantially increase the cost of the studded tubes but would also impair the weldability. In addition, the life of the welded joints would be short, particularly where high alloy steel studs are welded to carbon steel or low alloy steel tubes. Nickel alloy steels, although desirable from the standpoint of strength, cannot be used due to the fact that nickel reacts more readily with $H_2S$ than does iron, and because the resulting NiS forms, with the iron, a readily melting eutectic.

Figure 2:
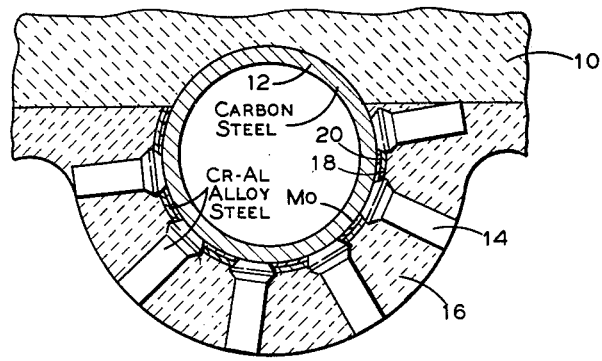

Of the drawings:
FIG. 1 is a fragmentary horizontal cross-section of a furnace wall constructed in accordance with the invention; and
FIG. 2 is an enlarged view of one of the wall tubes shown in FIG. 1.

In the drawings, a furnace wall 10 has its furnace side lined with a row of transversely spaced vertical carbon steel water tubes 12. Each of the tubes 12 has a multiplicity of headed metallic studs 14 radially arranged relative to and resistance welded to the furnace side of the tube 12. A layer of initially plastic refractory material 16 covers said tubes and studs to a depth corresponding to the length of the studs, leaving the inner end of the studs exposed to the furnace gases.

In accordance with the invention, tests have shown that the foregoing deterioration of the studs 14, with resulting disintegration of the refractory lining 16, can be avoided if studs of a low alloy carrosion-resistant steel are used, since disintegration of the studs and of the tube will not take place if the free ends of the studs resist the initial corrosion due to attack by $H_2S$. More particularly, the studs and tube may be formed of Cr-Al alloy steels containing Cr and Al as major alloying ingredients. Such steels may have the following percentage composition by weight:

Carbon _____ 0.12 max.
Silicon _____ 1.3–1.6
Mn _____ 1.0 max.
Al _____ 1.3–1.6
Cr _____ 12.0–25.0 balance iron with the usual impurities.

Specific corrosion resistant steels within the foregoing range have essentially the same composition, except for Cr but have chromium contents of the order of 13% (12%–14%), 18% (17%–19%), and 24% (23%–25%).

These particular chrome alloys steels exhibit satisfactory welding characteristics even by comparison with the usual steels used for the low alloy tubing. A studded tube produced in this manner is relatively inexpensive, since only the studs are made of the Cr alloy steel. It has further been found that the welded joints between the studs and the tube are improved if the studs are joined to the tubes by means of a stud welding gun rather than by automatic welding apparatus.

As a further feature of the invention, the surface of the carbon steel tube, between the studs, may be protected from corrosion by having applied thereto a spray coating 18 of the above Cr-Al alloy steels. A coating layer of about 0.2 mm. thick is found sufficient for corrosion resistance. The adhesion of the layer of Cr-Al alloy steel is improved if the tube is first sprayed with a thin film 20 of Mo as an undercoating 20. Both the Mo undercoating and the Cr-Al outer coating 18 may be applied either before or after the studs are welded to the tubes.

As a variation, if it is desired to merely assure the surface of the tube being wear resistant, then only the Mo undercoating need be applied. While this is a thin coating, it will diffuse with the steel by reason of the high melting point of Mo, the fusion being sufficiently deep into the steel to create a durable bond so that the Mo coating will not peel off with the usual thermal expansion to which the tube may be subjected. The Mo film may also be sprayed on either before or after the studs are attached, and whether Mo per se is used as the coating or a high Mo alloy is used as the coating will depend on the service requirements in the particular case.

As still a further feature of the refractory lined studded tube wall according to the invention, it is desirable to use a refractory 16 which is particularly resistant to the reducing action of $H_2S$. While the chrome-oxide type of refractory usually used for lining studded tube walls has good refractory properties, it is not capable of long withstanding the reducing action of $H_2S$. An oxide type lining with the best refractory properties at present available in adequate quantities and at economic cost is titanium oxide. For this reason, the best results with the studded tube wall of the invention are achieved when the refractory lining applied thereto is either titanium oxide or a mixture of this oxide with other ceramic materials.

While specific embodiments of the invention have been shown and described in detail to illustrate the application

What is claimed is:

1. In a furnace for burning a slag-forming solid fuel under furnace temperatures above the fuel ash fusion temperature and evolving corrosive furnace gases containing $H_2S$, a furnace wall cooling tube of carbon steel having metallic studs welded at spaced points on the furnace side of said tube, said studs being formed of a low alloy corrosion-resistant steel having chromium and aluminum as major alloying ingredients and the balance substantially all iron, and a layer of refractory material resistant to the reducing action of $H_2S$ arranged to line the furnace side of said tube and of a thickness sufficient to cover substantially all of the length of said studs.

2. A studded tube as claimed in claim 1, the interstud surface of said tube having thereon a coating consisting essentially of Mo.

3. A studded tube as claimed in claim 1, the interstud surface of said tube having thereon a coating consisting essentially of Mo covered with a coating of said alloy steel.

4. A refractory-lined studded tube wall for a slag tap furnace, operating under combustion conditions such that corrosive gases are evolved, comprising a plurality of studded tubes each consisting of a carbon steel tube having welded on the furnace side thereof studs of an alloy steel having the following percentage composition by weight:

| | |
|---|---|
| C | 0.12 max. |
| Si | 1.3 to 1.6 |
| Mn | 1.0 max. |
| Al | 1.3 to 1.6 |
| Cr | 12.0 to 25.0 | balance iron with the usual impurities; and a refractory lining covering the furnace side of said tubes to a depth of the order of the length of said studs; said refractory lining comprising a material selected from the class consisting of titanium oxide and a mixture of titanium oxide with ceramic material.

5. A refractory-lined studded tube wall for a slag-tap furnace as claimed in claim 4, the inter-stud surface of said tube having thereon a coating consisting essentially of Mo covered with a coating of said alloy steel.

6. In a furnace for burning a slag-forming solid fuel under furnace temperatures above the fuel ash fusion temperature and evolving corrosive furnace gases containing $H_2S$, a furnace wall cooling tube of carbon steel having metallic studs welded at spaced points on the furnace side of said tube, said studs being formed of a low alloy corrosion-resistant steel having 12.0–25.0% chromium, 1.3–1.6% aluminum and the balance substantially all iron, and a layer of refractory material resistant to the reducing action of $H_2S$ arranged to line the furnace side of said tube and of a thickness sufficient to cover substantially all of the length of said studs.

References Cited in the file of this patent

UNITED STATES PATENTS

| | | |
|---|---|---|
| 1,578,254 | Bennett | Mar. 30, 1926 |
| 1,706,130 | Ruder | Mar. 19, 1929 |
| 1,850,953 | Armstrong | Mar. 22, 1932 |
| 2,077,410 | Harter et al. | Apr. 20, 1937 |
| 2,093,686 | Murray | Sept. 21, 1937 |
| 2,588,421 | Shepard | Mar. 11, 1952 |

FOREIGN PATENTS

| | | |
|---|---|---|
| 557,853 | Great Britain | Dec. 8, 1943 |

OTHER REFERENCES

A. B. Searle: Refractory Materials: Their Manufacture and Uses, third edition, 1950, published by Charles Griffin and Company, Limited, 42 Drury Lane, W. C. 2, London.